United States Patent
Porobic et al.

(10) Patent No.: US 9,984,081 B2
(45) Date of Patent: May 29, 2018

(54) WORKLOAD AWARE DATA PLACEMENT FOR JOIN-BASED QUERY PROCESSING IN A CLUSTER

(71) Applicant: Oracle International Corporation, Redwood Shores, CA (US)

(72) Inventors: Danica Porobic, Chavannes-pres-Renens (CH); Sabina Petride, Hayward, CA (US); Sam Idicula, Santa Clara, CA (US)

(73) Assignee: Oracle International Corporation, Redwood City, CA (US)

( * ) Notice: Subject to any disclaimer, the term of this patent is extended or adjusted under 35 U.S.C. 154(b) by 499 days.

(21) Appl. No.: 14/610,892

(22) Filed: Jan. 30, 2015

(65) Prior Publication Data

US 2016/0224579 A1  Aug. 4, 2016

(51) Int. Cl.
    *G06F 17/30* (2006.01)

(52) U.S. Cl.
    CPC .. *G06F 17/30094* (2013.01); *G06F 17/30129* (2013.01); *G06F 17/30498* (2013.01); *G06F 17/30979* (2013.01)

(58) Field of Classification Search
    CPC ......... G06F 17/30094; G06F 17/30129; G06F 17/30498; G06F 17/30979

USPC ....................................................... 707/714
See application file for complete search history.

(56) References Cited

U.S. PATENT DOCUMENTS 6,112,198 A    8/2000 Lohman et al.
2004/0122845 A1    6/2004 Lohman et al.

OTHER PUBLICATIONS

Kossmann D: "The State of the Art in Distrubuted Query Processing" ACM Computing Surveys, ACM, New York, NY, US, vol. 32, No. 4, dated Dec. 1, 2000, 48 pages.
Apers P M G: "Data Allocation in Distributed Database Systems", ACM Transactions on Database Systems, ACM New York, NY, vol. 13, No. 3, dated Sep. 1, 1988, 42 pages.

*Primary Examiner* — Joshua Bullock
(74) *Attorney, Agent, or Firm* — Hickman Palermo Becker Bingham LLP

(57) ABSTRACT

A method for distributing tables to a cluster of nodes managed by database management system (DBMS), is disclosed. Multiple data placement schemes are evaluated based on a query workload set to select a data placement scheme for the cluster of nodes. Tables, used in join operations in the workload set, are selected for evaluation of data placement schemes. Query execution costs for the workload set are generated based on estimating a query execution cost for each data placement scheme for the tables. The data placement scheme that has least costly estimated execution cost for the workload set is selected as the data placement scheme for the cluster of nodes managed by DBMS.

26 Claims, 4 Drawing Sheets

WORKLOAD AWARE DATA PLACEMENT FOR JOIN-BASED QUERY PROCESSING IN A CLUSTER

FIELD OF THE INVENTION

The present invention relates generally to database management systems and more particularly to cluster assisted database management systems.

BACKGROUND

Query processing has been optimized for disk-based systems, because these systems can hold very large tables on which the processing operates. A common operation in query processing is a join operation on very large tables. Such a join operation may incur many I/O operations to the disk system, reducing performance. An alternative to disk-based systems is a cluster of computing nodes, each of which has a processor, a modest amount of memory, and non-persistent storage for storing table data accessed by query processing, and each of which are connected together through a network. A cluster of computing nodes, however, can have a very large number, in fact, thousands of nodes. The aggregate memory and processing power of the large number of nodes provides the benefits of cluster over disk based systems.

However, since the computing nodes of a cluster have relatively small memory compared to the disk storage of disk based systems, each node may not be able to store all the database objects required for a join operation in a query. Thus, to complete a join operation, data may need to be shuffled back and forth from one node to another. Such transport of data across the network of the cluster adds transmission latency to query processing and may make the cost of accomplishing the join operation higher than on a disk-based system. To obtain the most performance from a cluster, a mechanism is needed to optimally place data from database objects on cluster nodes to minimize the effects of network latency for query processing of operations, such as joins.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings of certain embodiments in which like reference numerals refer to corresponding parts throughout the figures.

DETAILED DESCRIPTION

Figure 1:
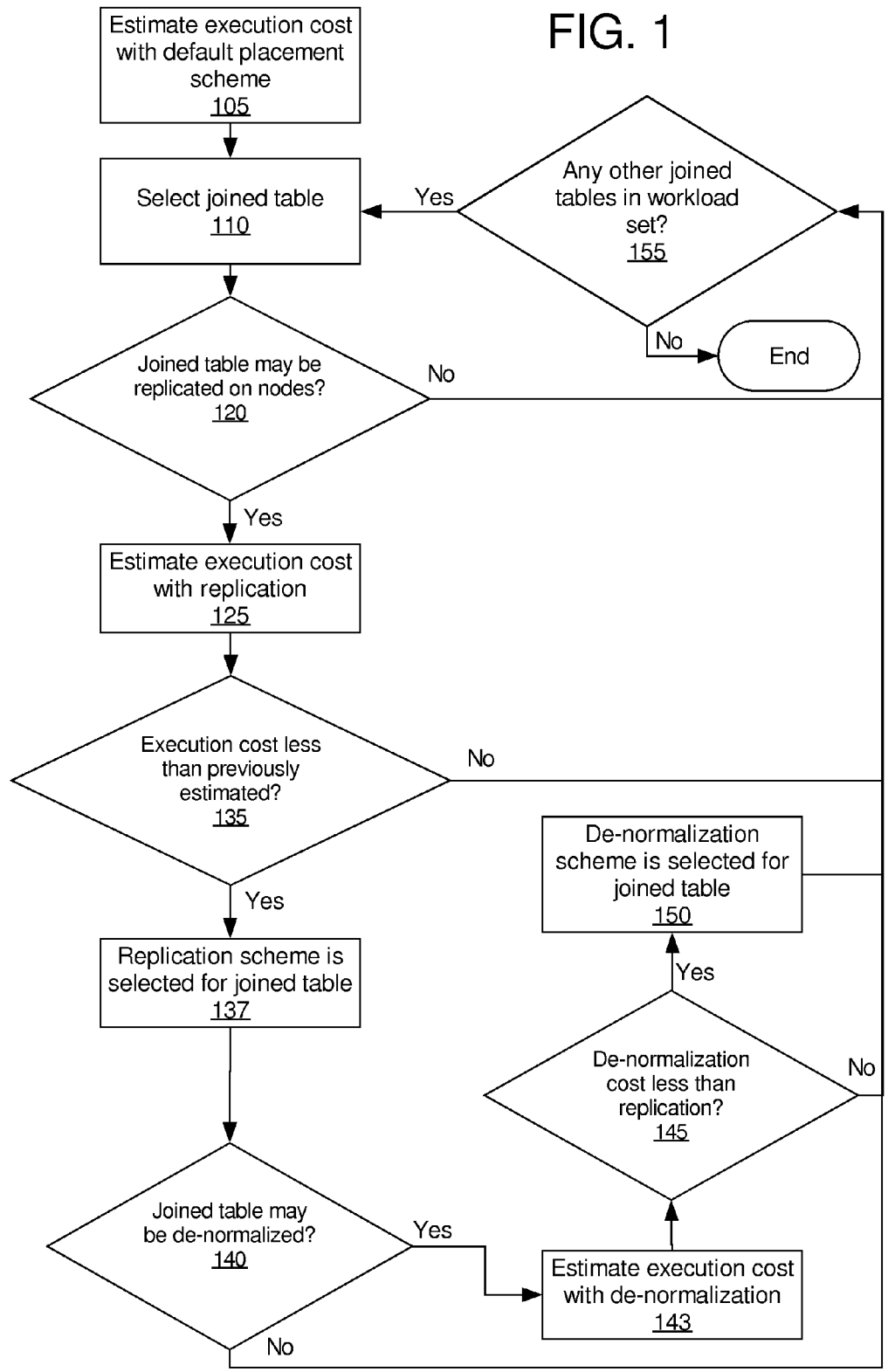
FIG. 1 is a flow chart depicting a procedure for a replication or de-normalization data placement schemes selection, according to one or more embodiments.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

To speed up the processing of join operations on a cluster based database management system (DBMS), techniques for selecting optimal data placement schemes for distribution of tables across nodes of the cluster are described herein. The data placement schemes may be derived by analyzing a set of queries, such as a workload set, that may be executed on a DBMS. Tables from the workload set are evaluated for the tables' size to determine whether the tables or portions of the tables may be replicated across the nodes of the cluster, in an embodiment. The cluster memory space may be evaluated for replication or de-normalization data placement schemes for tables. If a table size meets a cluster node memory limit, then the replication or de-normalization scheme may be selected based on estimated execution cost of the workload set.

Next, for each table that is not selected for replication or de-normalization, the co-partitioning scheme may be selected, in an embodiment. Partitioning, as used herein, refers to splitting a table into multiple parts, referred to as partitions, based on sets of values in a particular key column. Co-partitioning, as used herein, refers to partitioning multiple tables on the same sets of values in particular key columns of each of the tables. The partitions that correspond to the same set of values in the particular key columns may be stored on a same node of the cluster.

The columns that are used in join operations (referred herein as "join keys") are used for partitioning tables in multiple partitions, and then, the multiple partitions are stored across nodes of a cluster. For tables that are joined on multiple join keys in queries, techniques for choosing the join key to minimize the execution cost of the workload set are also described herein.

Workload Set Based Data Placement Schemes

A DBMS may evaluate alternative data placement schemes for storing tables of a database management system in a cluster based on a workload set of queries, in an embodiment. A data placement scheme specifies the distribution of tables across the cluster of nodes. A workload set is a collection of queries and execution plans of the queries. According to one embodiment, a workload set is stored as an SQL Tuning Set. SQL Tuning Sets are described in "SQL TUNING SETS", application Ser. No. 10/936,449, filed on Sep. 7, 2004, the entire contents of which are hereby incorporated by reference.

A DBMS may evaluate the workload set and particularly execution plans to identify join operations, in an embodiment. The tables in each of the join operations are joined on a particular column in each of the tables, the particular column being referred to herein as "join key" and the tables as "joined tables." The joined table with which another joined table is joined in a join operation is referred to herein as "co-joined table." When a joined table is included in more than one join operation, the table may contain multiple join keys. For example, a workload set may include a first query, "SELECT*FROM A INNER JOIN B ON B.COL1=A.COL1," and a second query, "SELECT*FROM C INNER JOIN B ON B.COL2=C.COL1." According to these two queries, joined tables A and C, each has a single join key, COL1 and COL2 respectively. However, joined table B has two join keys: COL1 and COL2. In this example, the DBMS may perform the two join operations: joined table B with co-joined table A based on comparison of values from A.COL1 and B.COL1 columns; and joined table C with co-joined table B based on comparison of values of B.COL2 and C.COL1 columns.

Join operations may be performed on joined tables across cluster nodes, in an embodiment. To execute a query with a join operation on joined tables that are stored on different cluster nodes, a DBMS may aggregate the data from the joined tables on one or more common nodes at the runtime of the query. A DBMS may then utilize the processing power of the common nodes for comparison and filtering values from join keys of the joined tables. In a related embodiment, the DBMS may perform a join operation by replicating one of the joined tables on each node that the co-joined table is stored on, and request those nodes to perform the processing of join key values. This join operation is referred to as "broadcast join" because the joined table is broadcasted onto nodes of the co-joined table for the nodes to perform a join operation. For instance, continuing with the above example, if the first query is executed on a cluster of nodes, the DBMS may replicate joined table B on all nodes that store co-joined table A, or vice versa, replicate joined table A on all nodes that co-joined table B is stored. On each of those nodes, the join keys A.COL1 and B.COL1 are compared and filtered to produce a dataset of rows from table A and B where values of A.COL1 and B.COL1 columns match. The second query may also be executed on a cluster using a similar approach.

Replication Data Placement Scheme

A DBMS may distribute a joined table in advance of a query execution by replicating the joined table on nodes of a cluster, in an embodiment. This placement scheme for a joined table is referred herein as "replication scheme." According to the replication scheme, the DBMS may store a copy of a joined table in the memory of each cluster node to improve query execution on the cluster. By storing a copy of the joined table on each node, a join operation in a cluster may be performed completely locally on the node, without transmitting data of joined tables from other nodes. The elimination of the latency of cluster network at the query runtime may positively impact the query performance. In a related embodiment, the DBMS may replicate a joined table on a subset of nodes in a cluster. The DBMS may replicate a joined table only on the nodes that store co-joined tables of queries in a workload set. By replicating a joined table only on a subset of nodes in a cluster, the DBMS may save memory space in the nodes that are outside of the subset. However, if the DBMS executes another query that contains a join operation of the joined table with another table that is not one of the co-joined tables in the workload set, then the DBMS may have to replicate the joined table on the nodes where the co-joined table is stored at the query runtime.

De-Normalization Data Placement Scheme

A DBMS may distribute a joined table by de-normalizing a joined table on nodes of a cluster that store a co-joined table prior to query execution on the cluster, in an embodiment. This placement scheme is referred herein as a "de-normalization scheme." De-normalizing may be accomplished by performing a full outer join operation of the joined table with the co-joined table on the join keys, in a related embodiment. The operation would generate a joined dataset that contains all rows of the joined tables aligned together on the join key. If a row of the joined table contains a join key value not found in the co-joined table, the co-joined table would contain no values for that row of the joined dataset. To de-normalize the joined table across the cluster, the joined table may be replicated to the nodes that store the co-joined table, and the DBMS may then generate the joined dataset containing the joined and co-joined tables and store the dataset on the nodes. For example, if the co-joined table is stored on two or more nodes, then the joined table may be de-normalized with a portion of the co-joined table that is stored on each of the two or more nodes. As a result, the generated joined dataset may be stored on the two or more nodes.

Continuing with the above example, joined table B may be replicated by storing a copy of joined table B onto each of the set of nodes that stores co-joined table A, in an embodiment. On each of the set of nodes, a full outer join operation is performed on table B with table A to generate a joined dataset. Rows of co-joined table A, where A.COL1 value is equal to B.COL1, are joined together. Rows of co-joined table A, where A.COL1 value has no equivalent value in B.COL1, are added to the joined dataset with the columns corresponding to table B containing no values for those rows. Similarly, rows of joined table B, where B.COL1 value has no equivalent value in A.COL1 column, are added to the joined dataset with the columns corresponding to table A containing no value. Once joined, the joined dataset contains joined table B's and co-joined table A's data stored on the set of cluster nodes. Thus, when the first query of the above example is executed by a DBMS on the cluster, no replication may be necessary, furthermore, no joining of rows of table A and table B may be necessary as well: the nodes may need to only perform filtering operation at runtime. The filtering operation may filter out the rows of the joined dataset that contain no values for either co-joined table A rows or joined table B rows, leaving only the rows of the dataset that have been matched based on the join key. The DBMS may then return the join operation of table A with table B based on the filtered joined dataset. By performing only the filtering operation on a cluster of nodes, the de-normalization scheme may save the latency time of data transmission between nodes, as well as time for matching operations performed on the nodes.

Co-Partition Data Placement Scheme

A DBMS may also co-partition a joined table with a co-joined table on nodes of a cluster, in an embodiment. The corresponding partitions from the co-partitioning of the joined table and the co-joined table are stored on the same node. Such a placement scheme by co-partitioning of a joined table on a cluster of nodes is referred herein as "co-partition scheme."

A DBMS may co-partition a joined table with a co-joined table based on join keys, in an embodiment. The join key values may be divided into sets of value, referred to herein as "divisions." In a related embodiment, the divisions may be based on ranges, referred to herein as "range division." For example, when the join keys are of a numeric type (INTEGER, NUMBER or other), then the join key values may be range divided based on numeric ranges; when the join keys are of a string type (VARCHAR or other), then the join key values may be divided based on an alphanumeric character value range.

After dividing, the join key into sets of values, the DBMS may match the values in the join key columns of the joined table and co-joined table to each of the sets. The rows that have matching join key values in a particular set may then be stored on a node of the cluster. Thus, the node of a cluster may contain a partition from the joined table and a partition from a co-joined table, where both of the partitions include rows that have join key values matching to those in the particular set.

In a related embodiment, the number of divisions for the join key values may depend on the number of nodes available and the availability of memory space on the available nodes that the joined and co-joined tables may be stored on. A cluster node may at minimum fit a partition of the joined table and a partition of the co-joined table. The size of the corresponding partitions may be directly dependent on the number of rows that contain matching values to the values of a division of the join key. Thus, the DBMS may manipulate the number of divisions of the join key values to better match the memory space and number of nodes available on the cluster.

A DBMS may perform a join operation on a joined table and a co-joined table that are co-partitioned on a cluster, in an embodiment. The DBMS may perform the join operation by joining each of the partitions of the joined table and co-joined table that are stored on the same node. Since these partitions correspond to the same division of the join keys, each join performed locally on a node may yield a portion of a resulting dataset of the join operation. The DBMS may then group all the portions of the resulting dataset to return the dataset as an output for the join operation.

Continuing with the example of the workload set of the first query above, the DBMS may determine to co-partition table A and table B for the first query join operation on node 1 and node 2. To partition table A and table B, the DBMS derives the full range of values for join key A.COL1 and B.COL1 columns. For instance, if A.COL1 and B.COL1 are of integer type, and A.COL1 contains a minimum value of 10 and a maximum value of 1000, while B.COL1 has the respective minimum value of 1 and maximum value of 100, then the full range of the join keys would be values 1-1000. The full range is then divided into two sub-ranges of values such as 1-500 and 501-1000. The first partition of table A that consists of rows with A.COL1 values in 1-500 range are stored on node 1, while the other partition of table A, where rows have A.COL1 column in 501-1000 range, is stored on node 2. Similarly, the first partition of table B that consists of rows with B.COL1 column in 1-500 range are stored on node 1 as well, while the other partition of table B, where rows have B.COL1 column in 501-1000 range, is stored on node 2 as well. Thus, when the first query is executed by the DBMS, the DBMS may perform an inner join operation on node 1 for the first partitions of table A and table B, respectively. The operation would generate a resulting data set for 1-500 value range of the join keys. The DBMS may also perform an inner join operation on node 2 for the other partitions of table and table B, respectively. That operation would generate another resulting data set for 501-1000 value range of the join keys. Then, the DBMS may group the two data sets to obtain the full data set of results for the first query.

Selecting Data Placement Scheme

Based on the properties of joined tables and join operations in queries of a workload set, the joined tables may be replicated to nodes of a cluster, in an embodiment. A DBMS may evaluate the size of a joined table and determine that the joined table may be replicated to nodes of a cluster. The DBMS may determine that the joined table may be replicated by comparing the size of the joined table to the size of memory of nodes in the cluster. If the size of the joined table is less than the memory available at a node, then the DBMS may replicate and store a copy of the table on that node of the cluster. In a related embodiment, the DBMS may evaluate each and every node of the cluster for replication of the joined table.

In addition to size considerations, the DBMS may also take into account the improvement in the workload set execution cost as a result of the replication of the joined table. "Workload set execution cost" refers to summation of system resource costs for execution of each query in a workload set. Thus, the improvement in the workload set execution cost may be due to the join operation requiring less system resources. For example, when a join operation is executed on a cluster, the DBMS need not broadcast joined table to nodes that have a copy of the joined table stored on them. Therefore, DMBS may substantially reduce the workload set execution cost.

In another embodiment, further improvements to workload set execution cost may be made by de-normalizing the replicated joined tables. De-normalizing a joined table removes the necessity for matching to be performed during execution of a join operation by a node that stores a joined and a co-joined table. Therefore, the node may only perform a filtering operation to produce a resulting data set for the join operation at the execution time.

FIG. 1 is a flow chart depicting a procedure for selecting the replication or de-normalization data placement schemes for joined tables in a workload set, in accordance with one or more embodiments. At block 105, the workload set execution cost is estimated based on a default data placement scheme by a DBMS. The default data placement scheme may include replication, de-normalization or co-partitioning data placement schemes for tables in the workload set. At block 110, a joined table that has not been previously evaluated, is selected from joined operations of the workload set.

Based on evaluation of memory space availability on the relevant cluster nodes, the DBMS may determine whether a joined table can be replicated on each relevant node of the cluster at block 120. The relevant nodes may include all nodes of the cluster or may include only those nodes of the cluster that have a co-joined table stored on the nodes. If so, then, at block 125, the workload set execution cost is evaluated based on the joined table being replicated and available on each node. If, at block 135, the newly estimated workload set execution cost is less than the previously estimated workload set execution cost (such as the default execution cost from block 105), then the replication scheme is selected for the joined table at block 137.

The workload set execution cost may be further reduced by de-normalization of the joined table, in a related embodiment. At block 140, the DBMS evaluates the space availability for de-normalization on the relevant nodes. If there is no memory availability for the de-normalization of the joined table, then the process proceeds to block 155 to select the next joined table. Otherwise, at block 143, the DBMS estimates workload set execution cost by de-normalizing the joined table on the replicated nodes with co-joined tables.

Based on the determination of the execution cost at block 143, if the cost with the de-normalization scheme evaluates to be less than with the replication scheme at block 145, the de-normalization scheme may be selected for the joined table on the cluster at block 150. Whether or not de-normalization or replication is selected for the joined table, the process proceeds to block 155. At block 155, the next joined table from the joined tables from joined operations in queries of the workload set, is selected.

The procedure depicted in FIG. 1 may be illustrated on an example of the above described workload set of the first and second query, where tables A, B, and C are qualified or disqualified for replication on each node of a cluster based on respective sizes of the tables. When table A is selected at block 110, table A would be evaluated for replication by estimating execution costs of the first query and the second query. Since table A would be available on each node of the cluster, the first query join operation on table A with table B would have less execution cost, while the second query execution cost would remain unchanged as table A is not part of the join operation. Thus, table A is selected for the replication scheme at block 137 because the replication would improve the workload set execution cost.

Next, table B is selected at block 110 for placement scheme determination. Replicating table B would not improve the execution cost of the first query because table A of the first query join operation would be already available on each node of the cluster. However, replicating table B would improve the execution cost of the second query where table B is joined with table C because table B would be available on each node and the join operation with table C could be performed locally on the node. Since both table B and table A would be stored on each node, the workload set execution cost may be further improved by de-normalizing table B with table A to improve the join operation of the first query. Finally, when table C is selected for evaluation at block 110, the replication of table C would not improve either queries' execution cost. The execution of the second query would be already performed locally because each node contains table B already, and the first query does not include any operation on table C.

Recursively Selecting Data Placement Scheme

In a related embodiment, operations in FIG. 1 may be recursively performed for each of the previously evaluated co-joined tables. Once a joined table is selected for the replication scheme at block 137, operations in blocks 120 through 150 may be repeated for all the already evaluated co-joined tables of the joined table that have been selected for the replication scheme. With the selection of the replication scheme for the joined table, execution costs of many queries may be unaffected by the replication of the previously evaluated co-joined table. For example, continuing with example of the previously evaluated workload set, when table B is selected for replication, previous selection of table A for replication does not affect the execution cost any longer. Thus, when table A is again re-evaluated for the replication scheme, the cost of the workload set would remain unchanged because table B is available on each node of the cluster, and join operation of table A with table B may be already performed locally on a node without table A's replication. Thus, only table B's replication would similarly reduce the execution cost of the workload set without the necessity to replicate table A or C across nodes of the cluster. Therefore, recursive evaluation of joined tables may yield not only the least costly execution for a workload set but also memory space optimal data placement scheme for a cluster.

Figure 2:
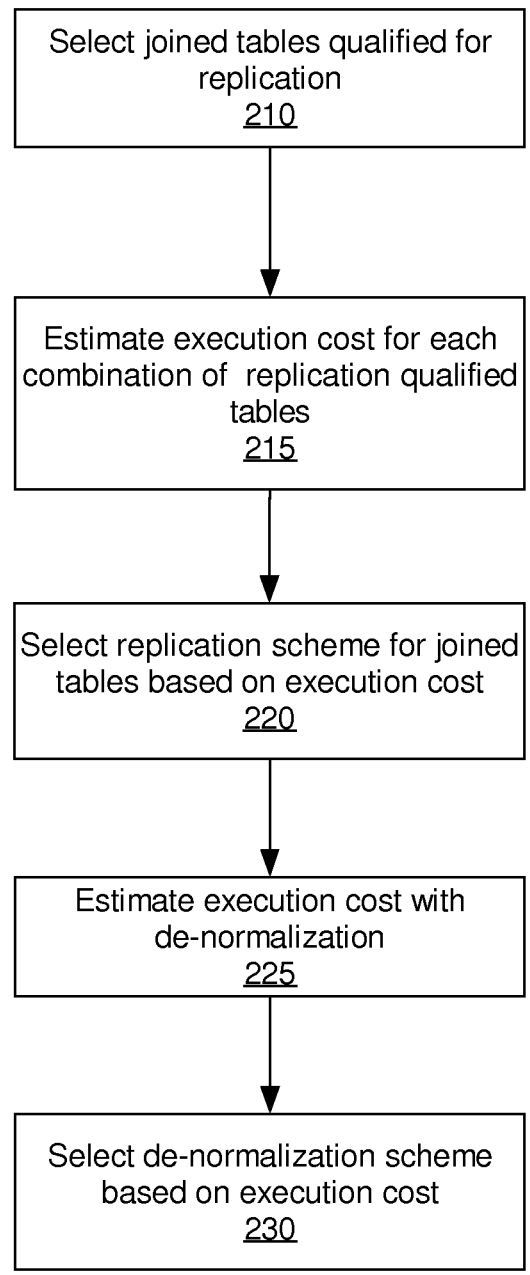
FIG. 2 is a flow chart depicting a procedure for a recursive selection of data placement schemes, according to one or more embodiments.

In accordance with alternative one or more embodiments, FIG. 2 is a flow chart depicting a procedure for recursively selecting the replication or de-normalization data placement schemes for joined tables. At block 210, joined tables from a workload set may each be evaluated based on its size and cluster nodes memory space to determine which joined tables qualify to be replicated. At block 215, execution costs for the workload set are estimated based on replication of each qualified joined table alone or in combination with replication of other qualified joined tables. To do so, the workload set execution cost with a replication of a qualified joined table may first be estimated. Then, a second execution cost with a replication of the qualified table together with replication of another qualified table may be estimated for the workload set. This process is then repeated recursively until execution costs for replication all combinations of qualified joined tables are estimated. At block 220, the combination of qualified joined tables that yielded the least workload set execution cost is determined, and for each of the qualified joined tables in the combination, the replication scheme is selected. If two or more combinations have the same workload set execution cost, then the combination with the least number of tables may be selected to save memory space on nodes of the cluster.

In a related embodiment, if replicating a qualified joined table alone does not improve the workload set execution plan, then any combination that includes the qualified joined table may not need to be evaluated. Thus, according to this embodiment, if the workload set execution cost is estimated to be the same for a cluster with replicating a qualified joined table, then the workload set execution cost may not be estimated for the cluster with replicating the qualified joined table with any other qualified joined table.

In another related embodiment, for qualified joined tables that have been selected for replication scheme, the workload set execution costs are also estimated for de-normalization scheme at block 225. The workload set execution cost for de-normalizing joined tables with co-joined tables that have been qualified for replication, is estimated. If the workload set cost is estimated to improve for such qualified joined tables, the de-normalization scheme is selected at block 230.

The embodiments of FIG. 2 may be illustrated on an example of the above described workload set of the first and second query, where tables A, B, and C are qualified to be replicated onto each node of a cluster based on their respective size. At block 215, the workload set execution costs for replication of table A only; table B only; table C only; tables A and B; tables B and C; tables A and C; and tables A, B and C are each respectively calculated. To reduce the number of table combinations to estimate workload set execution cost with replication, according to the related embodiment, the number of combinations may be pruned. For example, if the estimate workload set execution cost with replication of table A only is not improved, then the combinations that contain table A, such as tables A and B; tables A and C; and tables A, B and C may not need to be estimated for. Similar, pruning may be done for table B and table C. At block 220, the tables of tables from the combinations that has the least execution cost, are selected for the replication scheme. The selected tables may also be considered for de-normalization as described at blocks 225 and 230.

Co-Partitioning Data Placement Scheme

Since the cluster has limited storage capacity, the memory allowed for replication on each node is limited, therefore not all joined tables may qualify for replication, in an embodiment. The non-qualified joined tables may be co-partitioned with co-joined tables on a cluster. Since a joined table may be co-joined with multiple tables on different join keys, all different combinations of co-partitioning joined tables based on the different join keys may be evaluated for the workload set. The co-partitioning scheme that has the lowest estimated workload set execution cost may be selected for the cluster.

Figure 3:
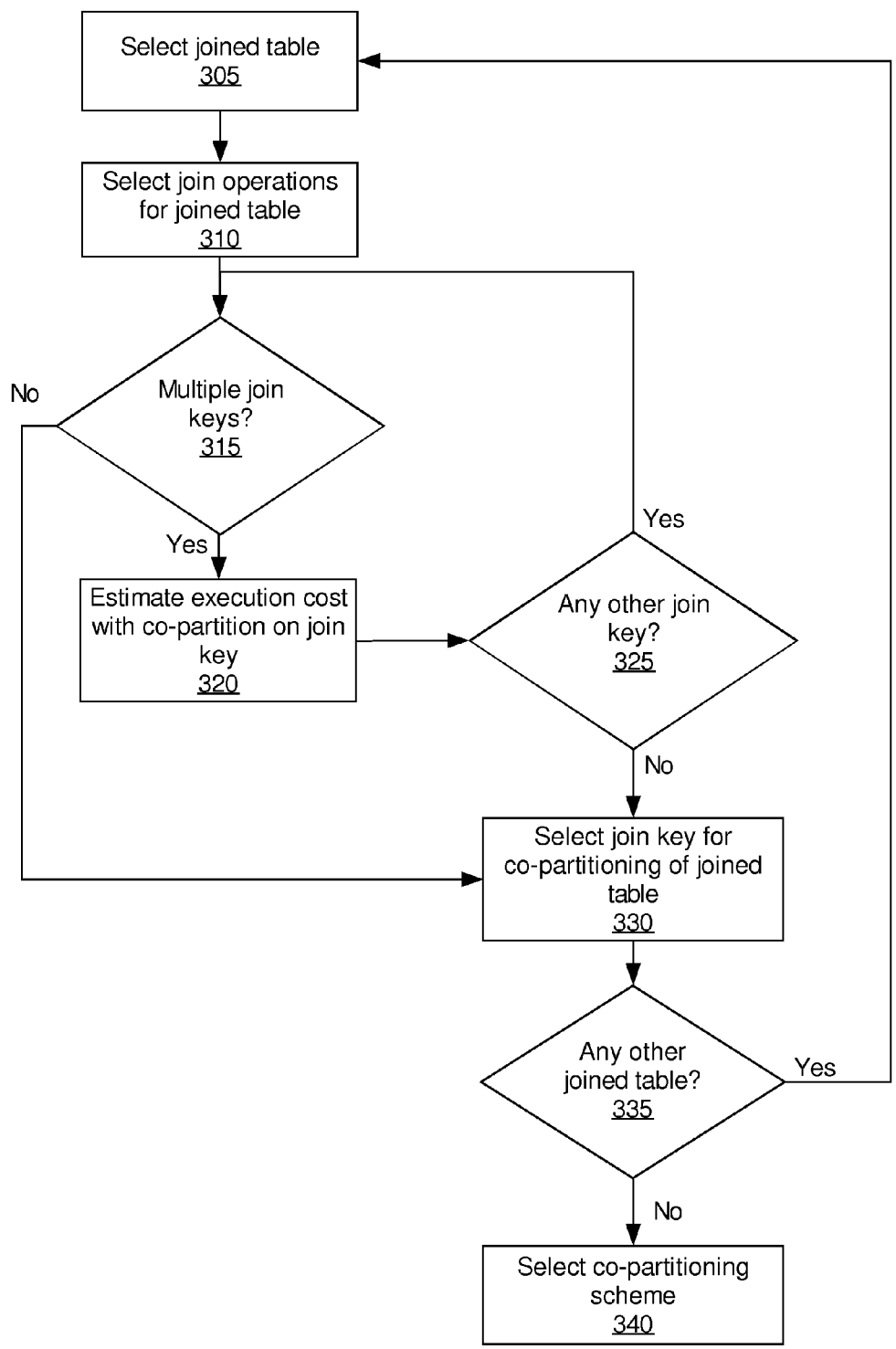
FIG. 3 is a flow chart depicting a procedure for a co-partitioning of joined tables on a cluster, in an embodiment.

FIG. 3 is a flow chart depicting a procedure for co-partitioning joined tables on a cluster, in an embodiment. At block 305, a joined table is selected from a workload set, and all the join operations that the joined table is part of, may also be selected at block 310. Based on the decision at block 315, if only a single join key exists for the joined table in the selected join operations, then the join key is selected for co-partitioning of the joined table at block 330.

However, the joined table may be part of multiple join operations using different join keys. If multiple join keys exist for the joined table in the selected join operations, then workload set execution costs may be estimated according to co-partitioning schemes for each of the respective join keys at block 320. In a related embodiment, if a co-partitioning scheme of the joined table on a particular join key has already been evaluated as part of evaluation of a co-joined table of the same join operation, then the execution cost of the previous estimation may be used.

When another join key is used for co-partitioning of the joined table, the workload set execution cost may change. At block 325, the process evaluates a co-partitioning scheme for each of the join keys and estimates the workload set execution cost for each of the respective schemes at block 320. Once the join key for co-partitioning of joined table is selected based on the least costly workload set execution cost, the process is then repeated for all joined tables in the workload set at block 335. At block 340, co-partitioning scheme is selected for the joined tables based on the selected join keys and estimated workload set costs.

The embodiments of FIG. 3 may be illustrated on an example of the above described workload set of the first and second query, where tables A, B, and C have size large enough not to be qualified for the replication scheme. Table A is only part of a single join operation with table B in the workload set. Thus, table A is evaluated for co-partitioning with co-joined table B on join key column A.COL1 as described in "Co-Partitioning Data Placement Scheme" section. Table B may then be similarly evaluated twice because table B is part of two join operation: one with table A on join key columns B.COL1 and another with table C on join key columns B.COL2. Since the workload set execution cost has been already estimated for the first query join operation, the workload execution cost need only be estimated for co-partitioning based on B.COL2. The workload set execution costs are compared at block 330 and the join key with the least cost is selected. If the selected join key is B.COL2, then, at block 340, the co-partitioning scheme for tables B and C based on join keys B.COL2 and C.COL1 is selected. Otherwise, the co-partitioning scheme for tables B and A based on join keys B.COL1 and A.COL1 is selected at block 340.

In a related embodiment, divisions of join key values may affect a workload set execution cost for a co-partitioning scheme. The size of a division of the join key values determines the partition size of the joined table and thus may depend on the size of available memory on nodes of the cluster. For example, if each node of the cluster has little memory space, then, to fit on a node, the division of join key values may be smaller to yield smaller partitions for the joined table and co-joined tables. Smaller divisions of join key values may correspond to less number of rows from the joined and co-joined tables that have matching values with each of the divisions. Accordingly, such co-partitioning may partition the joined table with co-joined tables into a greater number of smaller partitions. Thus, a greater number of nodes in the cluster may be needed to store the joined tables across the cluster. Since the data of the joined tables may become more spread out across the cluster nodes, additional network latency delays may be introduced into the execution of operations including this and other join operations. Accordingly, the workload set execution cost may vary depending on the selection of a join key. The process may take this dependency into account when the workload set execution cost is estimated for each join key at block 325 of FIG. 3.

Database Management Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored on persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
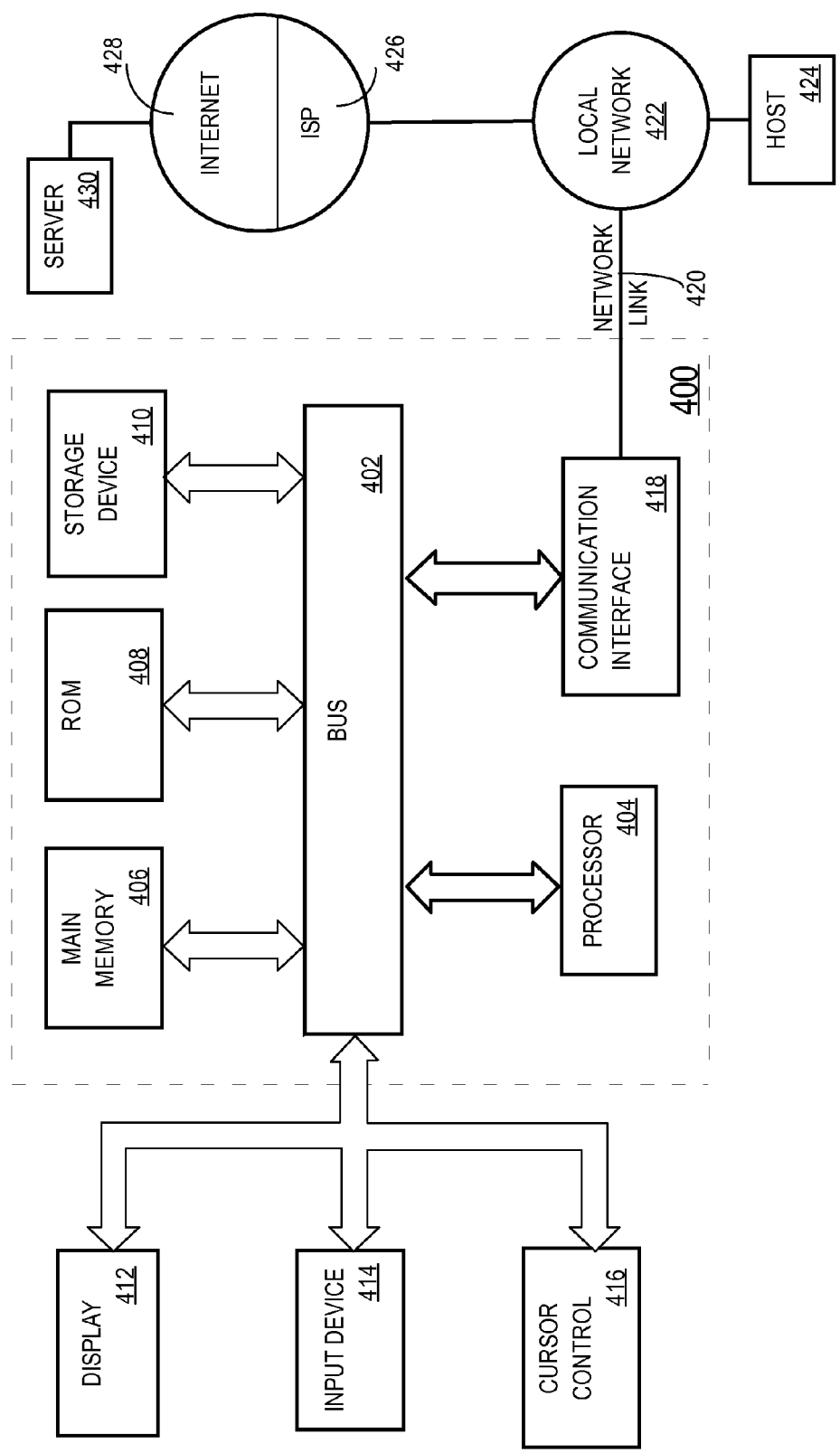
FIG. 4 is a block diagram that illustrates a computer system upon which an embodiment of the approach may be implemented.

For example, FIG. 4 is a block diagram that illustrates a computer system 400 upon which an embodiment of the approach may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing Overview

The techniques described herein are implemented using one or more processing solutions, examples of which include distributed systems, clustered computing systems, and cloud computing systems. In an embodiment, a DBMS and/or a cluster of nodes may be part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to the DBMS and the cluster of nodes, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for determining a distribution of tables from a database among a cluster of nodes coupled to a database management system (DBMS), the DBMS managing the database, nodes of the cluster configured to store the tables and evaluate queries on the tables from the database, comprising:
   selecting particular tables accessed by a workload set, said workload set comprising a set of queries, wherein said particular tables are used in one or more join operations of two or more queries of said workload set;
   determining a plurality of data placement schemes, each data placement scheme of said plurality of data placement schemes being a scheme for storing said particular tables on one or more nodes of the cluster;
   generating a plurality of query execution costs, wherein generating the plurality of query execution costs comprises, for each data placement scheme of said plurality of data placement schemes, estimating a query execution cost of said workload set using said each data placement scheme;
   selecting a certain data placement scheme from the plurality of data placement schemes based on the plurality of query execution costs for said workload set;
   storing the particular tables on the one or more nodes of the cluster according to the certain data placement scheme;
   after storing the particular tables on the one or more nodes of the cluster according to the certain data placement scheme, executing a query execution request directed to at least one table of the particular tables; and
   wherein the method is performed by one or more computing devices.

2. The method of claim 1, wherein the certain data placement scheme specifies that one or more tables of said particular tables are replicated on multiple nodes of said cluster of nodes.

3. The method of claim 2, wherein determining the plurality of data placement schemes further comprises:
   comparing sizes of said particular tables to available memory space on each of the multiple nodes of the cluster; and
   based on the comparing, determining that said one or more tables are able to be replicated on each of the multiple nodes of the cluster.

4. The method of claim 3, wherein one or more data placement schemes of the plurality of data placement schemes specifies a different combination of said one or more tables to be replicated on each of the multiple nodes of the cluster.

5. The method of claim 4, further comprising:
estimating a particular query execution cost of said workload set for a particular data placement scheme that specifies replicating a particular table of said particular tables;
determining that the particular query execution cost is not the least costly query execution cost of the plurality of query execution costs for said workload set;
generating the plurality of query execution costs for each data placement scheme of said one or more data placement schemes, wherein said one or more data placement schemes excludes data placement schemes that include the particular table in any combination with the one or more tables.

6. The method of claim 1, wherein the certain data placement scheme specifies that at least two tables of said particular tables are co-partitioned between multiple nodes of said cluster of nodes.

7. The method of claim 6, further comprising:
for a particular table of said particular tables, identifying a set of join operations wherein the set of join operations are performed on the particular table on one or more join keys with corresponding one or more co-joined tables; and
for each join key of the set of join operations:
estimating the query execution cost of said workload set, wherein the certain data placement scheme specifies a co-joined table, corresponding to said each join key, of the one or more co-joined tables and the particular table, being co-partitioned across the multiple nodes of said cluster.

8. The method of claim 7, wherein the one or more co-joined tables and the particular table being co-partitioned further comprises:
for each join key of the set of join operations:
partitioning values of columns, corresponding to said each join key, of the co-joined table and the particular table into a plurality of value sets;
for each value set in the plurality of value sets, storing on a node of the multiple nodes, rows of the co-joined table and of the particular table that correspond to values in the columns that are in said each value set.

9. The method of claim 7, further comprising, based on the estimating the query execution cost of said workload set for said each join key, selecting a particular join key for the certain data placement scheme from said one or more join keys, wherein the estimated query execution cost of said workload set is the least for the particular join key.

10. The method of claim 1, wherein the certain data placement scheme specifies storing a de-normalization based on particular one or more join operations, of said one or more join operations, between at least two tables of said particular tables.

11. The method of claim 10, wherein determining the plurality of data placement schemes further comprises:
comparing sizes of said particular tables to available memory space on each of multiple nodes of the cluster;
wherein the sizes of said particular tables are based on the certain data placement scheme specifying the de-normalization; and
based on the comparing, determining that said at least two tables are able to be de-normalized on each of the multiple nodes of the cluster.

12. The method of claim 10, wherein the de-normalization is based on join keys from the particular one or more join operations.

13. The method of claim 12, wherein the de-normalization comprises performing full outer join operations on the at least two tables based on the join keys from the particular one or more join operations.

14. One or more non-transitory storage media storing instructions which, when executed by one or more processors, cause:
determining a distribution of tables from a database among a cluster of nodes coupled to a database management system (DBMS), the DBMS managing the database, nodes of the cluster configured to store the tables and evaluate queries on the tables from the database, comprising:
selecting particular tables accessed by a workload set, said workload set comprising a set of queries, wherein said particular tables are used in one or more join operations of two or more queries of said workload set;
determining a plurality of data placement schemes, each data placement scheme of said plurality of data placement schemes being a scheme for storing said particular tables on one or more nodes of the cluster;
generating a plurality of query execution costs, wherein generating the plurality of query execution costs comprises, for each data placement scheme of said plurality of data placement schemes, estimating a query execution cost of said workload set using said each data placement scheme;
selecting a certain data placement scheme from the plurality of data placement schemes based on the plurality of query execution costs for said workload set;
storing the particular tables on the one or more nodes of the cluster according to the certain data placement scheme; and
after storing the particular tables on the one or more nodes of the cluster according to the certain data placement scheme, executing a query execution request directed to at least one table of the particular tables.

15. The non-transitory storage media of claim 14, wherein the certain data placement scheme specifies that one or more tables of said particular tables are replicated on multiple nodes of said cluster of nodes.

16. The non-transitory storage media of claim 15, wherein instructions, which when executed by said one or more processors cause determining the plurality of data placement schemes further include instructions, which when executed by said one or more processors, further cause:
comparing sizes of said particular tables to available memory space on each of the multiple nodes of the cluster; and
based on the comparing, determining that said one or more tables are able to be replicated on each of the multiple nodes of the cluster.

17. The non-transitory storage media of claim 16, wherein one or more data placement schemes of the plurality of data placement schemes specifies a different combination of said one or more tables to be replicated on each of the multiple nodes of the cluster.

18. The non-transitory storage media of claim 17, wherein the instructions include instructions, which when executed by said one or more processors, further cause:
estimating a particular query execution cost of said workload set for a particular data placement scheme that specifies replicating a particular table of said particular tables;

determining that the particular query execution cost is not the least costly query execution cost of the plurality of query execution costs for said workload set;

generating the plurality of query execution costs for each data placement scheme of said one or more data placement schemes, wherein said one or more data placement schemes excludes data placement schemes that include the particular table in any combination with the one or more tables.

19. The non-transitory storage media of claim 14, wherein the certain data placement scheme specifies that at least two tables of said particular tables are co-partitioned between multiple nodes of said cluster of nodes.

20. The non-transitory storage media of claim 19, wherein the instructions include instructions, which when executed by said one or more processors, further cause:

for a particular table of said particular tables, identifying a set of join operations wherein the set of join operations are performed on the particular table on one or more join keys with corresponding one or more co-joined tables; and for each join key of the set of join operations:
estimating the query execution cost of said workload set, wherein certain the data placement scheme specifies a co-joined table, corresponding to said each join key, of the one or more co-joined tables and the particular table, being co-partitioned across the multiple nodes of said cluster.

21. The non-transitory storage media of claim 20 wherein instructions for the one or more co-joined tables and the particular table being co-partitioned include instructions, which when executed by said one or more processors, further cause:

for each join key of the set of join operations:
partitioning values of columns, corresponding to said each join key, of the co-joined table and the particular table into a plurality of value sets;

for each value set in the plurality of value sets, storing on a node of the multiple nodes, rows of the co-joined table and of the particular table that correspond to values in the columns that are in said each value set.

22. The non-transitory storage media of claim 20, further comprising, based on the estimating the query execution cost of said workload set for said each join key, selecting a particular join key for the certain data placement scheme from said one or more join keys, wherein the estimated query execution cost of said workload set is the least for the particular join key.

23. The non-transitory storage media of claim 14, wherein the certain data placement scheme specifies storing a de-normalization based on particular one or more join operations, of said one or more join operations, between at least two tables of said particular tables.

24. The non-transitory storage media of claim 23, wherein instructions, which when executed by said one or more processors cause determining the plurality of data placement schemes further include instructions, which when executed by said one or more processors, further cause:

comparing sizes of said particular tables to available memory space on each of multiple nodes of the cluster;

wherein the sizes of said particular tables are based on the certain data placement scheme specifying the de-normalization; and based on the comparing, determining that said at least two tables are able to be de-normalized on each of the multiple nodes of the cluster.

25. The non-transitory storage media of claim 23, wherein the de-normalization is based on join keys from the particular one or more join operations.

26. The non-transitory storage media of claim 25, wherein the de-normalization comprises performing full outer join operations on the at least two tables based on the join keys from the particular one or more join operations.

* * * * *